B. GRIFFIN.
Sheep Rack.
No. 47,813. Patented May 23, 1865.
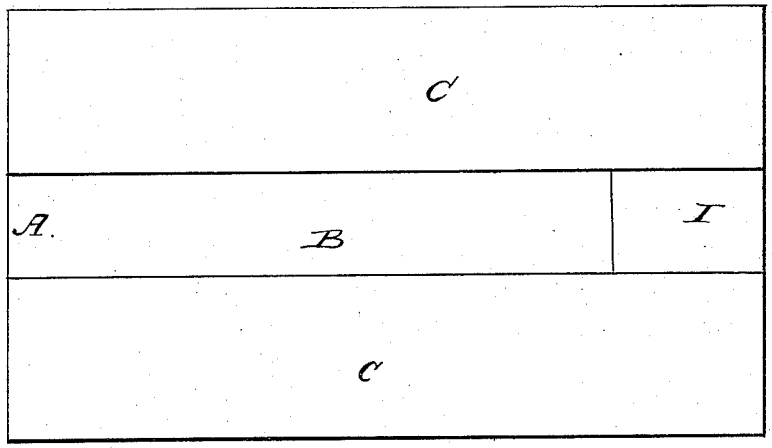
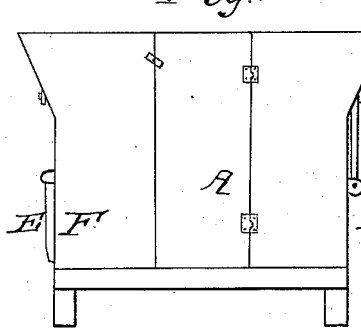
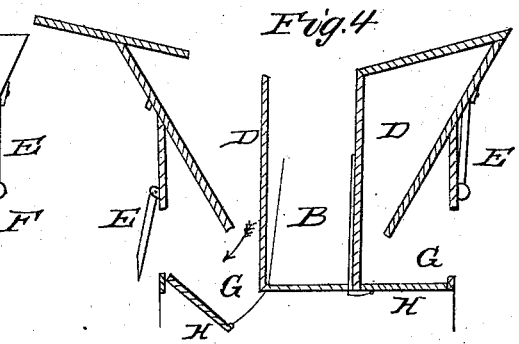
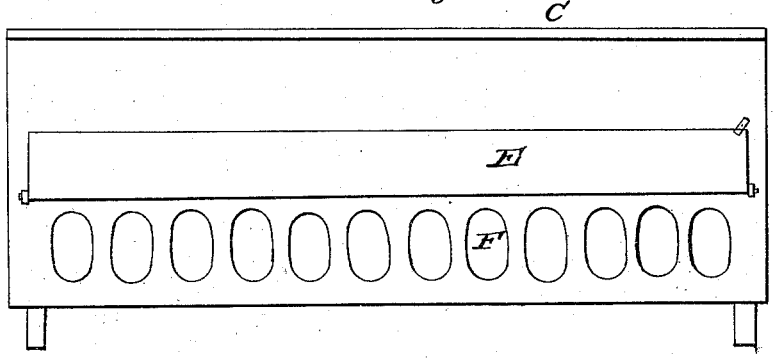

UNITED STATES PATENT OFFICE.

BENJAMIN GRIFFIN, OF LAWRENCE, MASSACHUSETTS.

IMPROVEMENT IN SHEEP-RACKS.

Specification forming part of Letters Patent No. 47,813, dated May 23, 1865.

*To all whom it may concern:*

Be it known that I, BENJAMIN GRIFFIN, of Lawrence, in the county of Essex and Commonwealth of Massachusetts, have invented a new and Improved Sheep Rack or Feeder; and I do hereby declare that the following is a full and exact description thereof, reference being had to the accompanying drawings, and to the letters of reference marked thereon.

To enable others skilled in the art to make and use my invention, I will proceed to describe its construction and operation.

Figure 1 represents side view of sheep-rack. Fig. 2 represents end view of sheep-rack. Fig. 3 represents view of upper side or top of rack. Fig. 4 represents an interior cross-section of rack.

A represents a door which opens into a passage.

B is a passage through which the attendant goes when feeding the sheep.

C are covers for the racks, which are opened to receive the feed into the racks D, and when closed they serve to protect the feed from the weather.

D are the racks into which the feed is put, and which passes down into the cribs G to the sheep.

E represents doors to raise up to let the sheep feed or down to shut up the rack.

F are openings for the sheep to reach their feed.

G are cribs from which the sheep take their feed.

H represents trap doors to close while the sheep are feeding, and when necessary to clean out the cribs they may be let down.

I represents a salt-box at one end of the passage.

Now, when I use my rack I let down the swing-doors E, and thus close the rack to prevent the sheep from crowding about the rack until they are properly fed. I then pass in through the door A and close it after me, to prevent the sheep from following. I then slide or lift the covers C, which may be hung with hinges or made to slide, and put the feed into the rack D, which passes easily down into the cribs G. I then pass out by the door A, and having closed it, I then lift the swing-doors E, and they receive their feed from the cribs G through the openings F. When they are done feeding, the trap-doors H are let down, and the refuse matter is thus easily carried away.

I claim—

The covers C, the swing-doors E, and the trap-doors H, for the purposes herein set forth.

BENJAMIN GRIFFIN.

Witnesses:
JAMES K. BARKER,
CLARA M. BARKER.